(12) United States Patent
Gardner (10) Patent No.: US 11,418,369 B2
(45) Date of Patent: Aug. 16, 2022

(54) MINIMIZING DC BIAS VOLTAGE DIFFERENCE ACROSS AC-BLOCKING CAPACITORS IN PODL SYSTEM

(71) Applicant: Analog Devices International Unlimited Company, Limerick (IE)

(72) Inventor: Andrew J. Gardner, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 43 days.

(21) Appl. No.: 16/940,937

(22) Filed: Jul. 28, 2020

(65) Prior Publication Data

US 2021/0036897 A1 Feb. 4, 2021

Related U.S. Application Data (60) Provisional application No. 62/881,849, filed on Aug. 1, 2019.

(51) Int. Cl.
*H04L 25/02* (2006.01)
*H04L 12/10* (2006.01)
(Continued)

(52) U.S. Cl.
CPC ........ *H04L 25/0266* (2013.01); *H02M 3/335* (2013.01); *H04L 12/10* (2013.01);
(Continued)

(58) Field of Classification Search
CPC ..... H04L 12/10; H04L 25/02; H04L 25/0276; H04L 25/0298; H04L 25/0266;
(Continued)

(56) References Cited

U.S. PATENT DOCUMENTS 5,519,289 A * 5/1996 Katyl ................. H05B 41/3921
315/307
5,717,685 A * 2/1998 Abraham ................. H04B 3/54
340/310.17
(Continued)

FOREIGN PATENT DOCUMENTS

EP 3384301 A1 10/2018

OTHER PUBLICATIONS

"European Application Serial No. 21188309.5, Partial European Search Report dated Dec. 23, 2021", 13 pgs.
(Continued)

*Primary Examiner* — James M Perez
(74) *Attorney, Agent, or Firm* — Schwegman Lundberg & Woessner, P.A.

(57) ABSTRACT

A PoDL system that uses a center-tapped transformer, for galvanic isolation of the PHY, has AC-coupling capacitors in series between the transmission wires and the transformer's secondary windings for blocking DC voltages generated by a PSE power supply. The center tap is conventionally connected to ground. As a result, one capacitor sees the full VPSE voltage across it, and the other capacitor sees approximately 0 V across it. Since the effective value of a ceramic capacitor significantly reduces with increasing DC bias voltages across it, the effective values of the capacitors will be very different, resulting in unbalanced data paths. This can lead to conversion of common mode noise and corrupt the data. To avoid this, a resistor divider is used to generate VPSE/2, and this voltage is applied to the center tap of the transformer. Therefore, the DC voltage across each capacitor is approximately VPSE/2, so their values remain equal.

20 Claims, 5 Drawing Sheets

(51) Int. Cl.
*H04L 12/40* (2006.01)
*H02M 3/335* (2006.01)

(52) U.S. Cl.
CPC .... *H04L 12/40045* (2013.01); *H04L 25/0272* (2013.01); *H04L 25/0298* (2013.01)

(58) Field of Classification Search
CPC ............. H04L 25/0272; H04L 25/0264; H04L 12/40045; H04B 3/54; H04B 3/548; H04B 3/56; H02M 3/22; H02M 3/24; H02M 3/28; H02M 3/325; H02M 3/335
See application file for complete search history.

(56) References Cited

U.S. PATENT DOCUMENTS

| | | | | |
|---|---|---|---|---|
| 5,986,539 | A * | 11/1999 | Johansson | H04L 12/403 307/106 |
| 6,104,707 | A * | 8/2000 | Abraham | H02J 13/00034 340/310.17 |
| 6,278,266 | B1 * | 8/2001 | Glasband | H02M 5/10 323/355 |
| 6,459,739 | B1 * | 10/2002 | Vitenberg | H04B 3/30 375/349 |
| 6,492,880 | B1 * | 12/2002 | Chiappe | H04L 25/0266 333/32 |
| 6,804,304 | B1 * | 10/2004 | Chan | H04B 3/23 375/257 |
| 7,200,176 | B1 * | 4/2007 | Paulos | H04L 25/0266 375/220 |
| 7,474,704 | B2 * | 1/2009 | Lum | H04L 12/10 375/257 |
| 7,711,967 | B2 * | 5/2010 | Woo | H04L 12/10 340/310.15 |
| 8,472,532 | B2 * | 6/2013 | Schley-May | H04B 1/10 375/349 |
| 8,582,271 | B2 * | 11/2013 | Bertin | H02H 9/046 361/111 |
| 8,928,425 | B1 * | 1/2015 | Sedarat | H04L 27/2647 333/177 |
| 8,929,468 | B1 * | 1/2015 | Voigt | H04B 3/42 370/284 |
| 9,379,785 | B2 * | 6/2016 | Shameli | H04B 5/02 |
| 9,385,790 | B1 * | 7/2016 | Mukherjee | H04B 5/0031 |
| 9,588,564 | B2 * | 3/2017 | Buckmeier | H01R 13/6633 |
| 9,590,695 | B1 * | 3/2017 | Sedarat | H04B 3/32 |
| 9,602,317 | B1 * | 3/2017 | Hailu | H03G 5/24 |
| 10,067,165 | B2 * | 9/2018 | Chen | G01R 17/02 |
| 10,135,626 | B2 * | 11/2018 | Pischl | H04L 12/10 |
| 10,148,447 | B1 * | 12/2018 | Rajagopal | H04L 12/10 |
| 10,205,539 | B2 * | 2/2019 | Chini | H04B 15/005 |
| 10,333,742 | B1 * | 6/2019 | Bhagwat | H04L 25/0276 |
| 10,382,005 | B2 * | 8/2019 | Gardner | H04L 12/40045 |
| 10,382,216 | B1 * | 8/2019 | Bhagwat | H04L 25/0272 |
| 10,404,502 | B2 * | 9/2019 | Gardner | H04L 25/085 |
| 10,425,237 | B1 * | 9/2019 | Bhagwat | H04L 12/10 |
| 10,444,823 | B2 * | 10/2019 | Gardner | H04L 12/40045 |
| 10,581,643 | B1 * | 3/2020 | Rajagopal | H04L 12/10 |
| 10,587,424 | B1 * | 3/2020 | Bhagwat | H02J 1/00 |
| 10,594,363 | B2 * | 3/2020 | Pandey | H04B 3/30 |
| 10,594,367 | B1 * | 3/2020 | Bhagwat | H02J 1/00 |
| 10,594,519 | B2 * | 3/2020 | Bhagwat | H04L 25/0272 |
| 10,649,945 | B1 * | 5/2020 | Geerling | G06F 13/4068 |
| 10,652,035 | B1 * | 5/2020 | Bhagwat | H02J 1/06 |
| 10,652,050 | B2 * | 5/2020 | Bhagwat | H02M 1/126 |
| 10,763,919 | B1 * | 9/2020 | Gardner | H02J 1/00 |
| 10,868,680 | B2 * | 12/2020 | Gardner | H02J 1/10 |
| 10,914,789 | B2 * | 2/2021 | Lemkin | G01R 31/3842 |
| 11,038,490 | B2 * | 6/2021 | Gardner | H04L 12/10 |
| 2004/0017689 | A1 * | 1/2004 | Zhang | H02M 5/45 363/71 |
| 2004/0239465 | A1 * | 12/2004 | Chen | H01F 19/08 336/173 |
| 2004/0257743 | A1 * | 12/2004 | Chen | H02H 9/04 361/119 |
| 2005/0219006 | A1 * | 10/2005 | Suenaga | H04L 25/0272 333/5 |
| 2006/0061304 | A1 * | 3/2006 | Cho | H05B 41/2824 315/307 |
| 2006/0092000 | A1 * | 5/2006 | Karam | H04L 12/10 713/300 |
| 2007/0025452 | A1 * | 2/2007 | Schindler | H04B 3/44 375/257 |
| 2007/0071112 | A1 * | 3/2007 | Gattani | H04L 25/0272 375/257 |
| 2007/0077819 | A1 * | 4/2007 | Thomson | H04L 12/10 439/620.01 |
| 2007/0087722 | A1 * | 4/2007 | Ichihara | H04B 3/54 455/343.1 |
| 2007/0153920 | A1 * | 7/2007 | Proebsting | H04L 25/0272 375/257 |
| 2007/0236853 | A1 * | 10/2007 | Crawley | H04L 12/10 361/119 |
| 2007/0297201 | A1 * | 12/2007 | Lee | H04L 25/0266 363/21.06 |
| 2008/0051158 | A1 * | 2/2008 | Male | H04L 25/0278 455/572 |
| 2008/0062600 | A1 * | 3/2008 | Crawley | H04L 25/0276 361/56 |
| 2008/0080105 | A1 * | 4/2008 | Blaha | H04L 12/10 361/38 |
| 2008/0136256 | A1 | 6/2008 | Gattani | |
| 2008/0238447 | A1 * | 10/2008 | de la Torre Vega | H04L 12/10 324/676 |
| 2008/0267212 | A1 * | 10/2008 | Crawley | H05K 9/0066 370/463 |
| 2008/0267301 | A1 * | 10/2008 | Alfano | H04L 25/0268 375/258 |
| 2009/0109709 | A1 * | 4/2009 | Nakahori | H02M 1/14 363/16 |
| 2009/0168461 | A1 * | 7/2009 | Nakahori | H02M 3/3378 363/17 |
| 2009/0207538 | A1 * | 8/2009 | Crawley | H04L 12/10 361/56 |
| 2010/0033165 | A1 * | 2/2010 | Rostamzadeh | G01R 31/001 324/127 |
| 2010/0218003 | A1 * | 8/2010 | Blaha | H04L 25/02 370/257 |
| 2010/0232181 | A1 * | 9/2010 | Nakahori | H01F 27/2804 336/221 |
| 2010/0246214 | A1 * | 9/2010 | Nakahori | H02M 3/335 363/17 |
| 2011/0130163 | A1 * | 6/2011 | Saban | H04W 88/085 455/517 |
| 2011/0217873 | A1 * | 9/2011 | Diab | H01R 13/66 439/620.01 |
| 2011/0243254 | A1 * | 10/2011 | Pischl | H04L 25/0276 375/257 |
| 2012/0086517 | A1 * | 4/2012 | Urabe | H04B 3/56 333/32 |
| 2012/0177133 | A1 * | 7/2012 | Oldenkamp | H04B 3/54 375/257 |
| 2013/0262884 | A1 * | 10/2013 | Yu | H04L 12/10 713/300 |
| 2013/0286864 | A1 * | 10/2013 | Karam | H04L 43/10 370/252 |
| 2014/0037077 | A1 * | 2/2014 | Marchetti | H04L 25/0282 379/93.06 |
| 2014/0092724 | A1 * | 4/2014 | Lontka | H04L 12/2838 370/221 |
| 2014/0136874 | A1 * | 5/2014 | Diab | H04L 43/50 713/340 |
| 2014/0139014 | A1 * | 5/2014 | Sontag | H04L 12/40045 307/1 |
| 2015/0029902 | A1 * | 1/2015 | Tischler | H04L 12/40189 370/276 |
| 2015/0333935 | A1 * | 11/2015 | Gardner | H04L 25/0272 307/1 |

(56) References Cited

U.S. PATENT DOCUMENTS

| | | | | |
|---|---|---|---|---|
| 2016/0054777 | A1* | 2/2016 | Dwelley | H04L 12/10 710/110 |
| 2016/0064924 | A1* | 3/2016 | Wiese | H02H 3/20 361/119 |
| 2016/0187951 | A1* | 6/2016 | Buckmeier | H04L 12/10 713/300 |
| 2016/0308683 | A1* | 10/2016 | Pischl | H04L 12/10 |
| 2017/0047744 | A1* | 2/2017 | Kim | H02M 1/42 |
| 2017/0178783 | A1* | 6/2017 | Lou | H01F 27/40 |
| 2017/0187472 | A1* | 6/2017 | Chini | H04B 15/005 |
| 2017/0194928 | A1* | 7/2017 | Xu | H01F 27/29 |
| 2017/0301455 | A1* | 10/2017 | Kobayashi | H01F 27/2823 |
| 2018/0024620 | A1* | 1/2018 | Gardner | H04L 25/0266 713/323 |
| 2018/0026525 | A1* | 1/2018 | Gardner | H03H 7/427 333/181 |
| 2018/0109041 | A1* | 4/2018 | Ramsey | H03H 7/427 |
| 2018/0145630 | A1* | 5/2018 | Zhang | H03B 5/1231 |
| 2018/0254931 | A1* | 9/2018 | Gardner | H04L 25/085 |
| 2019/0068385 | A1* | 2/2019 | Gardner | H02J 1/06 |
| 2019/0199400 | A1* | 6/2019 | Pandey | H04B 3/04 |
| 2019/0199401 | A1* | 6/2019 | Pandey | H04B 3/28 |
| 2019/0253284 | A1* | 8/2019 | Jalali Far | H04L 25/12 |
| 2019/0288862 | A1* | 9/2019 | Bhagwat | H04L 12/10 |
| 2019/0329666 | A1* | 10/2019 | Kodama | B60L 53/14 |
| 2019/0342123 | A1* | 11/2019 | Bhagwat | H04L 12/10 |
| 2019/0342124 | A1* | 11/2019 | Bhagwat | H04L 25/0266 |
| 2020/0044875 | A1* | 2/2020 | Gardner | H04L 12/10 |
| 2020/0145237 | A1* | 5/2020 | Bhagwat | H04L 12/10 |
| 2020/0204399 | A1* | 6/2020 | Crayford | H04L 12/40045 |
| 2020/0266854 | A1* | 8/2020 | Gardner | H01F 27/28 |
| 2020/0304106 | A1* | 9/2020 | Gardner | H04L 12/40045 |
| 2020/0402706 | A1* | 12/2020 | Igarashi | H01F 17/045 |
| 2021/0036897 | A1* | 2/2021 | Gardner | H04L 25/0276 |
| 2021/0352376 | A1* | 11/2021 | Huang | H04B 3/56 |

OTHER PUBLICATIONS

Grassi, F, et al., "Channel Characterization and EMC Assessment of a PLC System for Spacecraft DC Differential Power Buses", IEEE Transactions on Electromagnetic Compatibility, IEEE Service Center, New York, NY, US, vol. 53, No. 3, (Aug. 1, 2011), 664-675.

"European Application Serial No. 21188309.5, Extended European Search Report dated Mar. 23, 2022", 11 pgs.

"European Application Serial No. 22158955.9, Extended European Search Report dated Jun. 10, 2022", 7 pgs.

* cited by examiner

MINIMIZING DC BIAS VOLTAGE DIFFERENCE ACROSS AC-BLOCKING CAPACITORS IN PODL SYSTEM

CROSS-REFERENCE TO RELATED APPLICATIONS

This application is based on and claims priority from U.S. Provisional Application Ser. No. 62/881,849, filed Aug. 1, 2019, by Andrew J. Gardner, incorporated herein by reference.

FIELD OF THE INVENTION

The invention relates to Power over Data Lines (PoDL) systems, where DC power and data signals are provided over the same twisted wire pair, and, in particular, to techniques for equalizing the DC bias voltage across AC-coupling capacitors connected between the wires and the PHY.

BACKGROUND

Figure 1:
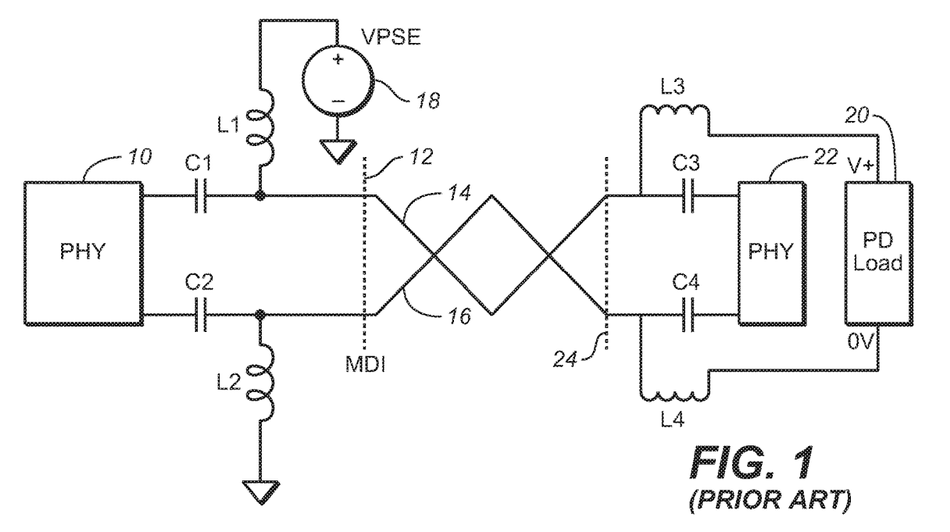
FIG. 1 illustrates a conventional PoDL system showing AC-coupling capacitors and DC-coupling inductors, where the capacitors have unequal effective values due to different DC voltages across them.

FIG. 1 is an example of one type of PoDL system where DC power and Ethernet differential data signals are provided over the same twisted wire pair. The Power Sourcing Equipment (PSE) is on the left side, and the Powered Device (PD) is on the right side.

A PHY 10 outputs differential data and receives differential data via a conventional Media Dependent Interface (MDI) connector 12 coupled to wires 14 and 16 of a twisted wire pair. The PHY 10 represents the physical layer in the OSI model and is a transceiver that typically includes signal conditioning and decoding circuitry for presenting bits to the next stage. The term PHY is a term of art and is defined by various IEEE standards, depending on the particular application. The PHY 10 is typically an integrated circuit. A digital processor (not shown) is coupled to the PHY 10 for processing the data. For purposes of this disclosure, the PHY 10 is a digital, differential data transceiver.

The PHY 10 is connected to the MDI connector 12 via AC-coupling capacitors C1 and C2. The capacitors C1 and C1 prevent DC voltage being coupled to the PHY 10 inputs to avoid corrupting the differential data and also prevent the PSE power supply 18 being shorted out by the PHY 10.

The PSE power supply 18 provides a suitable DC voltage across the wires 14 and 16, such as 45 VDC.

DC-coupling inductors L1 and L2 provide a high impedance to the data signals and a low impedance to the DC voltage, so the power supply 18 impedance does not load the data signals.

The PD side may be identical to the PSE side except that the DC voltage is coupled to a PD load 20 via the DC-coupling inductors L3 and L4. The AC-coupling capacitors C3 and C4 couple the differential data to the PHY 22. An MDI 24 couples the wires 14 and 16 to the PD circuitry. The PD load 20 may be any powered device, such as a sensor, camera, etc.

PSE and PD controllers are not shown and perform a handshaking routine to ensure the PD is compatible with PoDL. If the PD is PoDL-compatible, the PSE controller closes a switch to supply the full DC voltage across the wires 14 and 16.

Ceramic capacitors are commonly used in PoDL systems for AC-coupling due to their small size and other characteristics. It is well-known that the effective capacitance value of ceramic capacitors reduces as the DC voltage across the capacitor increases. Such a change in value is referred to as the DC bias characteristic of the capacitor or the capacitor's negative voltage coefficient. In some examples of ceramic capacitors used in PoDL systems, the nominal capacitance value (with 0V across it) is reduced by about 50% when the full PSE voltage of about 45 VDC is applied across it.

In the example of FIG. 1, the capacitor C1 sees approximately the full DC voltage of VPSE across it, while the capacitor C2 sees about 0V across it. Therefore, the effective value of the capacitor C1 is about half that of the capacitor C2. The same applies to the PD capacitors C3 and C4.

As a result of this difference in effective capacitor values, the capacitors C1 and C2 produce non-symmetrical effects on the differential data signals and on common mode signals (e.g., noise signals). So the data paths are unbalanced. In an extreme instance, the differences could result in conversion of a common mode noise signal into a signal that the PHY 10 interprets as a data signal.

Figure 2:
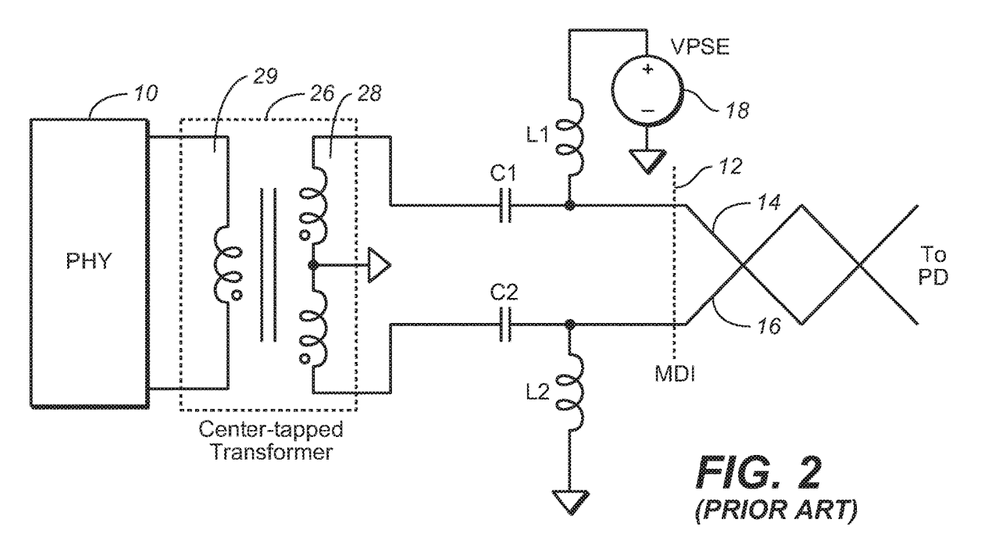
FIG. 2 illustrates the PSE side of another conventional PoDL system using a center-tapped transformer for isolation. AC-coupling capacitors and DC-coupling inductors are also used, where the capacitors have unequal effective values due to different DC voltages across them.

FIG. 2 illustrates another example of a PoDL system, where a center-tapped transformer 26 is used to galvanically isolate the PHY 10 from the wires 14 and 16. The PHY signals are magnetically coupled to the wire pair. The secondary windings 28 are coupled to the line-side, and the primary winding 29 is coupled across the terminals of the PHY 10. AC-coupling capacitors C1 and C2 are also present to prevent the secondary windings 28 of the transformer 26 from shorting out the PSE power supply 18. Since the center-tap of the transformer 26 is grounded, the DC bias across capacitor C1 is approximately VPSE while the DC bias across the capacitor C2 is approximately 0V. As a result, the capacitor C1 capacitance is substantially less than the capacitor C2 capacitance, leading to the same problems mentioned regarding FIG. 1.

What is needed is a technique whereby the AC-coupling capacitors in a PoDL system retain approximately equal effective values while blocking the DC voltage.

SUMMARY

Various PoDL circuits are described where the AC-coupling capacitors have approximately equal effective values at any DC bias voltage. The capacitors have the same nominal value at 0V bias.

In one embodiment of the inventive PoDL circuit, a first AC-coupling capacitor has one terminal coupled to the full PSE voltage of VPSE, and a second AC-coupling capacitor has one terminal coupled to approximately ground or other reference voltage, similar to the prior art. In the prior art, the other ends of both capacitors would be coupled to a low voltage, so there would be very different DC bias voltages across the two capacitors, causing their effective values to be very different. The present inventive technique uses a resistor divider to create the voltage VPSE/2. This voltage of VPSE/2 (instead of ground) is applied to the other ends of the capacitors, so both capacitors have VPSE/2 across them. Hence, even though the capacitance values have lowered due to the VPSE/2 bias, the capacitors' effective values remain equal. Therefore, the two data paths are balanced, resulting in more accurate data communication and higher efficiency.

In one example, the PoDL system uses a center-tapped transformer for isolation and to attenuate common mode noise. Instead of the center tap being coupled to ground, as in the prior art, the center tap is coupled to VPSE/2. In a related embodiment, the center tap is coupled to ground via an AC-coupling third capacitor to attenuate noise.

A common mode choke (CMC) may be added in series with the AC-coupling capacitors to further attenuate AC common mode noise.

In another embodiment, the same technique is employed in termination RC networks used to prevent reflections of any common mode noise on the twisted wire pair. The termination circuitry is generally designed to match the common mode impedance of the wire pair for maximum energy absorption and minimum reflectance while preserving the differential mode impedance presented by the transceiver. In the prior art, identical capacitor/resistors networks are used to terminate the wires in the PoDL system. In the prior art, both capacitors are coupled to ground, so one capacitor sees a high DC bias and the other capacitor sees a zero DC bias. This difference in DC bias voltages causes the termination networks to have different characteristics, possibly leading to the conversion of common mode noise signals to differential signals, corrupting the Ethernet data. By using the present invention, the voltage VPSE/2 is generated using a resistive divider, and the VPSE/2 voltage is applied to the common terminals of the termination capacitors instead of ground. Therefore, both termination capacitors see a DC bias voltage of VPSE/2, and their effective capacitances remain equal. Conversion of common mode noise signals is thus prevented due to the balanced termination networks.

BRIEF DESCRIPTION OF DRAWINGS

Elements in the various figures that are the same or equivalent are labelled with the same numerals.

DETAILED DESCRIPTION OF THE EMBODIMENTS

Figure 3:
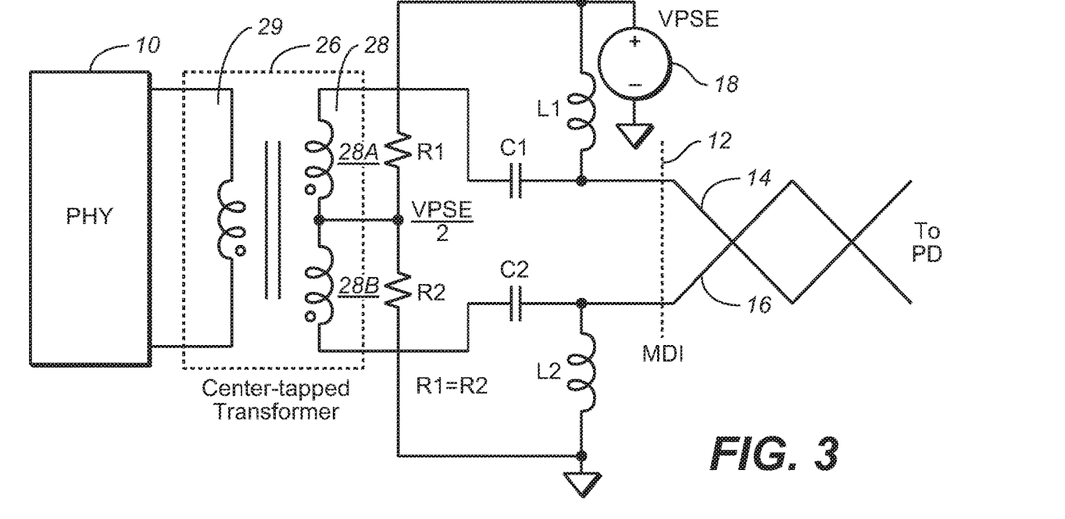
FIG. 3 illustrates the PSE side of one embodiment of the inventive PoDL system, shown as a modification to FIG. 2, where an intermediate voltage of approximately VPSE/2 is applied to the center tap of the transformer to equalize the DC voltages across the AC-coupling capacitors so they have substantially the same effective values.

FIG. 3 illustrates the PSE side of a PoDL system, similar to the PoDL system of FIG. 2, but where the AC-coupling capacitors C1 and C2 have the same DC voltage across them so they have the same effective value. This results in a more balanced circuit so that the differential data on the wires 14 and 16 see the same impedances for more accurate data communications.

In FIG. 3, a resistor divider is added, using equal value resistors R1 and R2, between the PSE power supply 18 output terminal (providing the voltage VPSE) and ground (i.e., the power supply's reference voltage). Thus, the voltage VPSE/2 is output at the common node of the resistors R1 and R2. This voltage VPSE/2 is applied to the center tap of the isolation transformer 26.

The inductor L1 couples the power supply's VPSE voltage to one end of the capacitor C1 and the wire 14, and the inductor L2 couples the ground voltage to one end of the capacitor C2 and the wire 16. The secondary windings 28 (comprising the upper secondary winding 28A and the lower secondary winding 28B) couple the center-tap voltage VPSE/2 to the other ends of the capacitors C1 and C2, resulting in both capacitors C1 and C2 having VPSE/2 across them. Since the DC bias voltages across both capacitors C1 and C2 are the same, the capacitors C1 and C2 have the same effective value. Therefore, the impedances for both the upper and lower data paths are the same, resulting in a balanced circuit for the differential data. This avoids the conversion of common mode noise into differential signals, which may corrupt the data communications. The primary winding 29 is connected across the terminals of the PHY 10.

Instead of a resistor divider, other forms of voltage dividers can be used. For example, equal value capacitors in series may form a suitable voltage divider.

Figure 4:
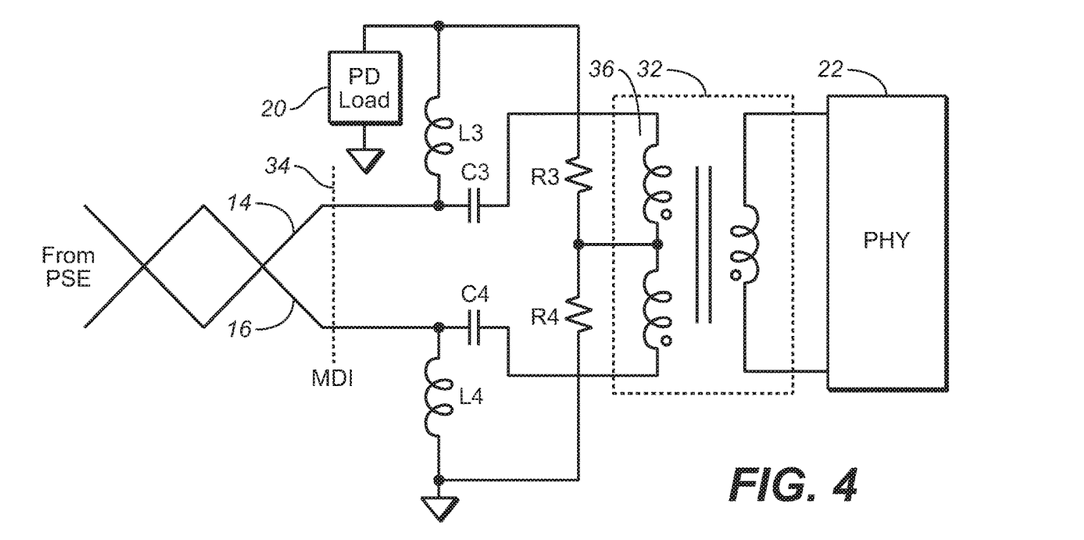
FIG. 4 illustrates the PD side of the PoDL system using the same technique shown in FIG. 3 to equalize the effective capacitor values.

FIG. 4 illustrates the PD side of the PoDL system, which also uses a center-tapped transformer 32 for galvanic isolation of the PHY 22 from the wires 14 and 16. Inductors L3 and L4 perform DC-coupling of the DC voltage on the wires 14 and 16 to the PD load 20 for powering the PD load 20. The PD load 20 may include a voltage regulator for generating a suitable voltage for circuitry within the PD load 20. Although not shown, the received or regulated DC voltage is also coupled to the PHY 22 for powering the PHY 22 and any other circuits. The capacitors C3 and C4 perform AC-coupling of the differential data signals to the PHY 22 via the transformer 32.

The DC voltage received at the MDI 34 is somewhat less than the full PSE voltage VPSE supplied by the PSE power supply 18 in FIG. 3 due to losses in the wires 14 and 16. This DC voltage is coupled, via inductors L3 and L4, across the resistive divider, formed by the equal value resistors R3 and R4, to generate an intermediate voltage. Similar to FIG. 3, one end of the capacitor C3 receives the full PSE voltage at the MDI 34 from the wire 14, and the other end of the capacitor C3 receives the intermediate voltage at its other end, via the secondary winding 36. Thus, approximately one-half of the full DC voltage is applied across the capacitor C3. One end of the other capacitor C4 receives the power supply reference voltage (e.g., ground voltage) from the wire 16, and the other end of the capacitor C4 receives the intermediate voltage via the secondary winding 36. Therefore, both capacitors C3 and C4 have the same DC voltage across them so they have equal effective values. As a result, the upper and lower data paths are balanced and there is no conversion of common mode noise to differential signals. Data accuracy is maintained even in a very noisy environment.

Figure 5:
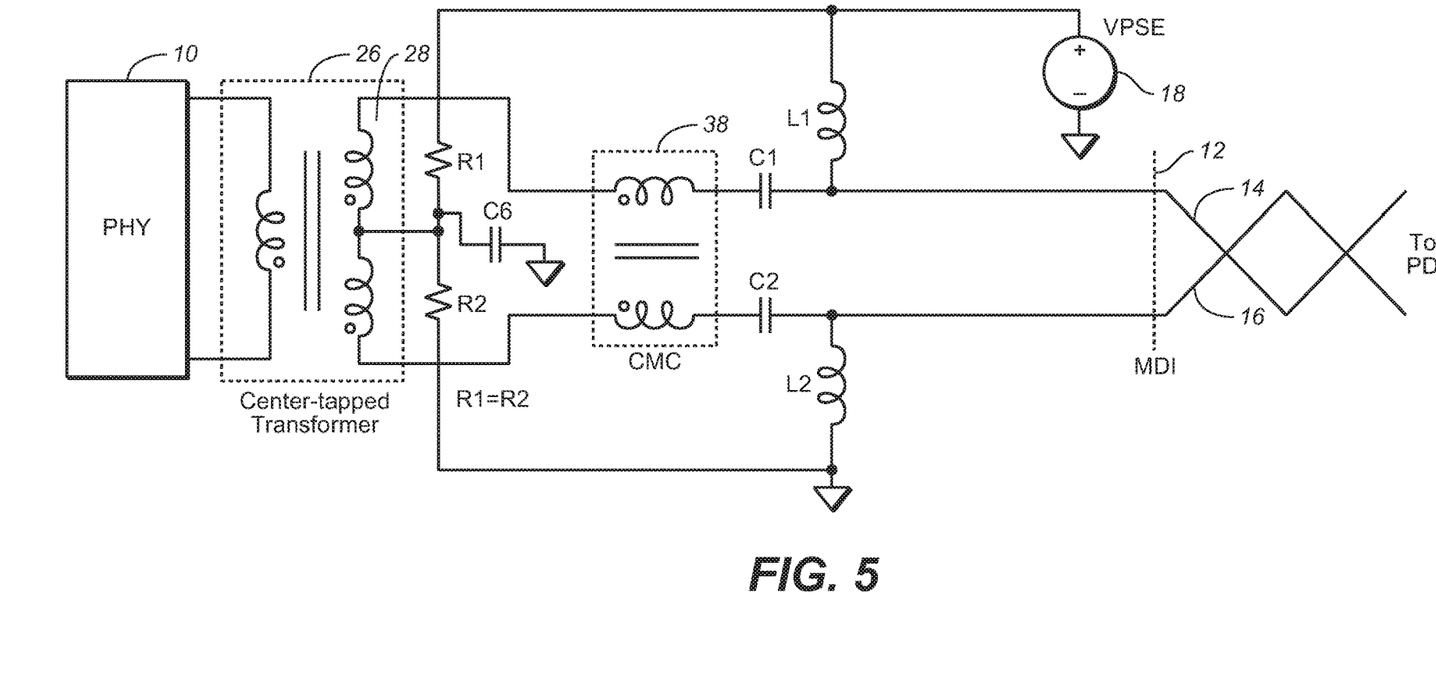
FIG. 5 is similar to FIG. 3 but AC-couples the center tap to ground via a bypass capacitor and adds a common mode choke (CMC) to further attenuate common mode noise.

FIG. 5 illustrates the use of an AC-coupling capacitor C6 coupling the center tap of the transformer 26 to ground (or other system reference) to provide a low impedance AC path to ground. The capacitor C6 is a bypass capacitor that couples AC noise to ground. The capacitor C6 has no effect on the DC voltage. This is useful in noisy environments. A common mode choke (CMC) 38 is also inserted in series with the data path to also attenuate common mode noise. The CMC 38 is an in-line transformer with two windings, where each winding is in series with a wire 14 or 16. As shown by the dots on the CMC 38 windings, the windings have the same polarity, so the magnetic fields generated by a differential mode signal are substantially cancelled out. Thus, the CMC 38 presents little inductance or impedance to differential-mode currents. Common mode currents, such as ambient noise in the wires 14 and 16, however, see a high impedance due to the combined inductances of the windings. The CMC 38 ideally eliminates or greatly attenuates common mode RF noise while providing no loss for the differential data or DC voltage signals.

The operation of the circuit of FIG. 5 is the same as the operation of FIG. 4 regarding the AC-coupling capacitors C1 and C2 seeing the same DC voltage across them. The inductors L1 and L2, the windings of the CMC 38, and the secondary windings 28 of the isolation transformer 26 conduct DC current so the capacitors C1 and C2 both have approximately one-half the full DC voltage across them, resulting in equal effective values.

Figure 6:
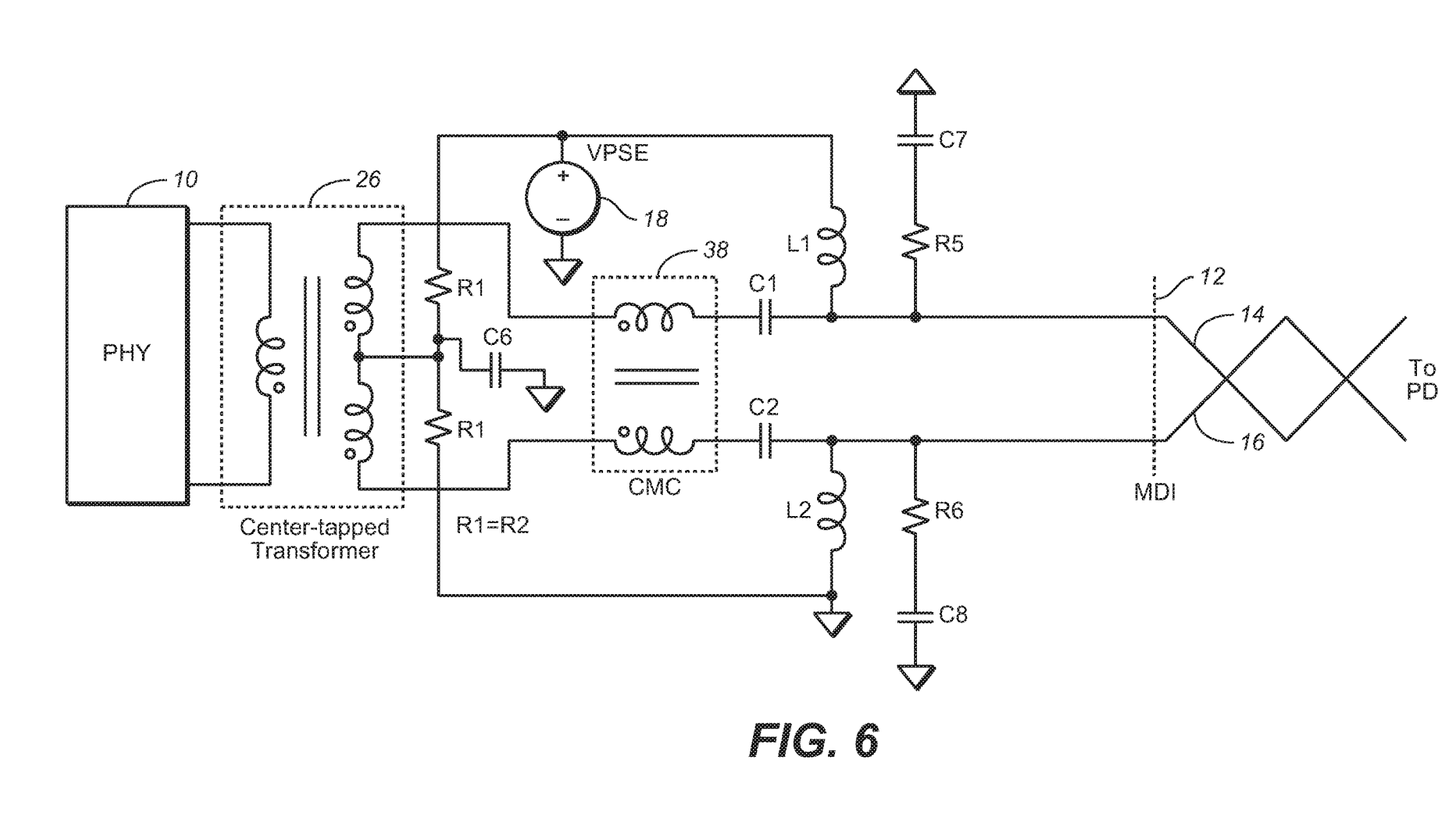
FIG. 6 illustrates the PoDL system of FIG. 5 but adds conventional RC termination networks to the wires (to prevent common mode noise reflections), resulting in the termination capacitors having different DC voltages across them, causing the termination capacitors to have different effective values.

FIG. 6 is identical to FIG. 5 except conventional RC termination networks are connected to the wires 14 and 16 to attenuate common mode noise. The wire 14 (carrying the voltage VPSE) is terminated by the series connection of the resistor R5 and the capacitor C7 to ground. The wire 16 (carrying the reference voltage) is terminated by the series connection of the resistor R6 and the capacitor C8 to ground. Thus, the capacitor C7 sees a high DC voltage (VPSE) across it, and the capacitor C8 sees a low DC voltage across it. As a result, the effective values of the capacitors C7 and C8 will be different, resulting in an unbalanced network. This may lead to conversion of common mode noise into differential signals that can corrupt the data.

Figure 7:
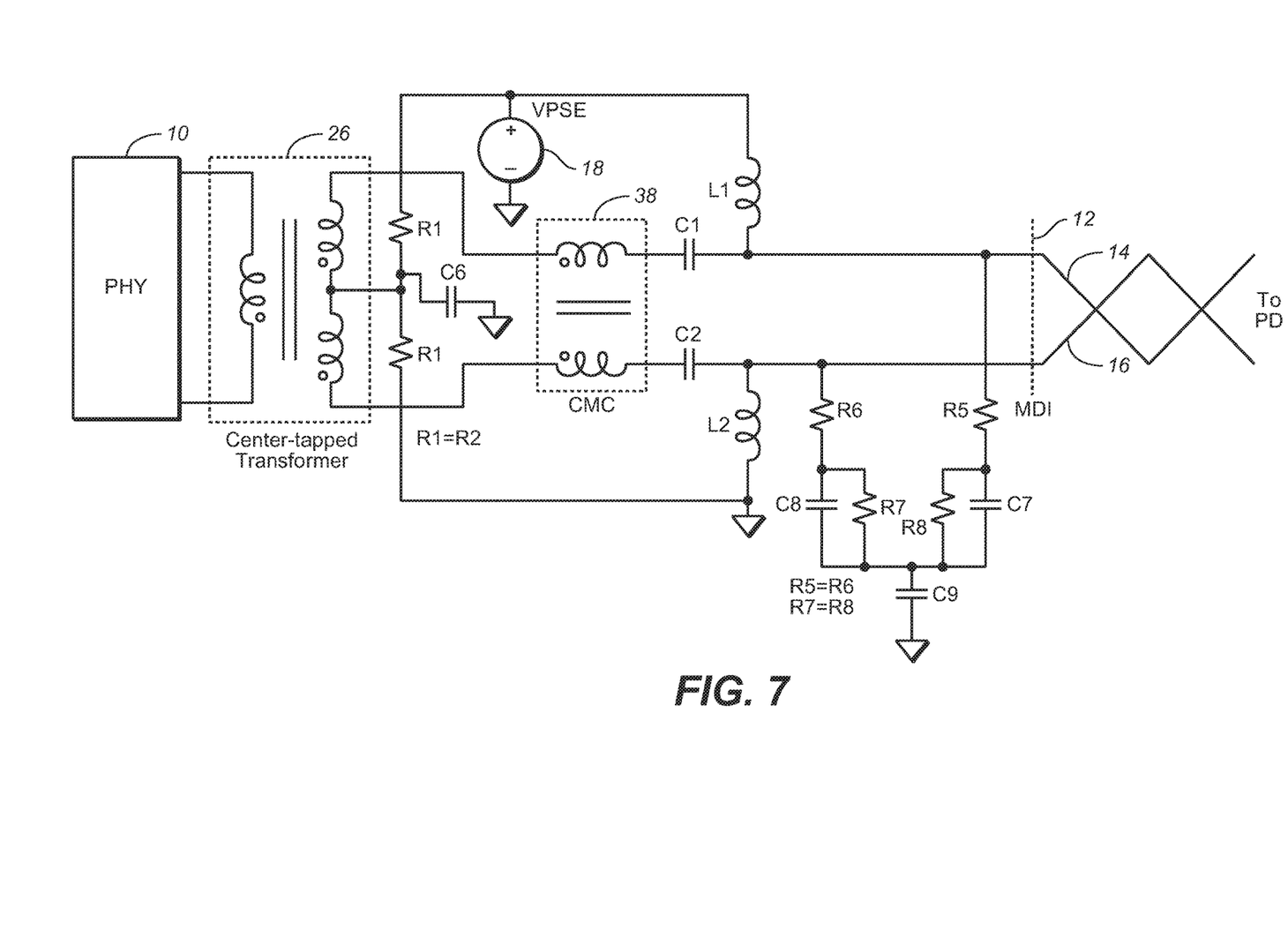
FIG. 7 illustrates the PoDL system of FIG. 6 but augments the RC termination networks with circuitry to cause the termination capacitors to have the same DC voltage across them so the termination capacitors have the same effective value.

FIG. 7 illustrates the application of the invention to the RC networks of a PoDL system. In FIG. 7, a resistor divider, formed by the equal value resistors R7 and R8, is connected across approximately VPSE and ground to generate VPSE/2 at their common node. This voltage VPSE/2 is coupled to the common node of the capacitors C7 and C8 so approximately VPSE/2 is across both capacitors C7 and C8. As a result, both capacitors C7 and C8 have the same effective value. An AC-coupling capacitor C9 couples the ends of capacitors C7 and C8 to ground. Due to the addition of the capacitor C9, the selection of the optimal values of the capacitors C7 and C8 needs to take into account the capacitance of the capacitor C9.

Although the inventive techniques have been primarily shown being applied to the PSE side of the PoDL system, the same techniques can also be applied to the PD side of the PoDL system, such as shown in FIG. 4. These techniques can be applied to any PoDL circuit using AC-coupling capacitors.

Although the figures show various components directly connected to each other or connected to each other via other circuitry, all such components are said to be "coupled" to one another. Accordingly, the term "coupled" does not require direct coupling.

Any of the disclosed features may be combined for a particular application.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Data Lines (PoDL) circuit comprising:
a DC power supply having a first terminal DC-coupled to a first conductor and a second terminal DC-coupled to a second conductor, wherein the first conductor and second conductor are for supplying DC power and differential data to a powered device (PD);
a first transceiver having a first terminal and a second terminal, the first transceiver for transmitting differential data signals over the first conductor and the second conductor and receiving differential data signals from the first conductor and the second conductor;
a center-tapped first transformer having a primary winding coupled across the first terminal and the second terminal of the first transceiver;
a first AC-coupling capacitor coupled in series with the first conductor, the first transformer having a first secondary winding coupled between the first AC-coupling capacitor and a center tap of the first transformer;
a second AC-coupling capacitor coupled in series with the second conductor, the first transformer having a second secondary winding coupled between the second AC-coupling capacitor and the center tap of the first transformer; and
a first voltage divider coupled to the DC power supply, the first voltage divider generating a first divided voltage of approximately one half of a voltage output by the DC power supply, wherein the first divided voltage is applied to the center tap of the first transformer.

2. The circuit of claim 1 further comprising a common mode choke (CMC) coupled in series between the first transformer and the first conductor and in series between the first transformer and the second conductor.

3. The circuit of claim 1 further comprising a first inductor coupled between the first terminal of the DC power supply and the first AC-coupling capacitor, and comprising a second inductor coupled between the second terminal of the DC power supply and the second AC-coupling capacitor.

4. The circuit of claim 1 further comprising a bypass capacitor coupled between the center tap of the first transformer and a reference voltage.

5. The circuit of claim 1 wherein the first voltage divider comprises a resistive voltage divider having a common node outputting the divided voltage.

6. The circuit of claim 1 further comprising a first RC termination circuit coupled to the first conductor, and a second RC termination circuit coupled to the second conductor,
wherein the first RC termination circuit includes a first resistor and a second resistor connected in series between the first conductor and a first node having a second divided voltage approximately one half of the voltage output by the DC power supply, and a first capacitor coupled in parallel to the second resistor,
wherein the second RC termination circuit includes a third resistor and a fourth resistor and a second capacitor coupled in parallel to the fourth resistor connected in series between the second conductor and the first node having the second divided voltage, and
wherein the first RC termination circuit and the second RC termination circuit are coupled to a reference voltage via a third capacitor.

7. The circuit of claim 1 further comprising a powered device (PD) coupled to the first conductor and the second conductor, the PD comprising:
- a second transceiver having a first terminal and a second terminal, the second transceiver for transmitting differential data signals over the first conductor and the second conductor and receiving differential data signals from the first conductor and the second conductor;
- a center-tapped second transformer having a primary winding coupled across the first terminal and the second terminal of the second transceiver;
- a third AC-coupling capacitor coupled in series with the first conductor, the second transformer having a first secondary winding coupled between the third AC-coupling capacitor and a center tap of the second transformer;
- a fourth AC-coupling capacitor coupled in series with the second conductor, the second transformer having a second secondary winding coupled between the fourth AC-coupling capacitor and the center tap of the second transformer; and
- a second voltage divider coupled across the first conductor and the second conductor for receiving a DC voltage from the DC power supply, the second voltage divider generating a second divided voltage of approximately one half of a voltage across the first conductor and the second conductor, wherein the second divided voltage is applied to the center tap of the second transformer.

8. The circuit of claim 7 wherein the second voltage divider is coupled to the first conductor via a first inductor and coupled to the second conductor via a second inductor.

9. The circuit of claim 8 further comprising a PD load coupled to the first inductor and the second inductor.

10. The circuit of claim 7 further comprising a bypass capacitor coupled between the center tap of the second transformer and a reference voltage.

11. The circuit of claim 7 wherein the second voltage divider comprises a resistive voltage divider having a common node outputting the second divided voltage.

12. The circuit of claim 1 wherein the first AC-coupling capacitor and the second AC-coupling capacitor are of a type that has a negative voltage coefficient.

13. A Power over Data Lines (PoDL) circuit connected to a first conductor and a second conductor, wherein a circuit supply having a first DC voltage is coupled across the first conductor and the second conductor, the circuit comprising:
- a first RC termination circuit coupled to the first conductor, wherein the first RC termination circuit includes a first resistor and a second resistor connected in series between the first conductor and a first node having a second DC voltage of approximately one half of the first DC voltage, and a first capacitor coupled in parallel to the second resistor;
- a second RC termination circuit coupled to the second conductor, wherein the second RC termination circuit includes a third resistor and a fourth resistor connected in series between the second conductor and the first node having the second DC voltage and a second capacitor coupled in parallel to the fourth resistor, and
wherein the first RC termination circuit and the second RC termination circuit are coupled to a reference voltage via a third capacitor.

14. The circuit of claim 13 wherein the first RC termination circuit and the second RC termination circuit are on a power source equipment (PSE) side of the first conductor and the second conductor.

15. The circuit of claim 13 wherein the first RC termination circuit and the second RC termination circuit are on a powered device (PD) side of the first conductor and the second conductor.

16. The circuit of claim 13 further comprising a voltage divider coupled across the first conductor and the second conductor for receiving the first DC voltage and generating the second DC voltage.

17. The circuit of claim 16 wherein the voltage divider is coupled to the first conductor via a first inductor and coupled to the second conductor via a second inductor.

18. The circuit of claim 16 wherein the voltage divider is coupled across terminals of a DC power supply.

19. The circuit of claim 16 wherein the voltage divider is coupled across terminals of a powered device load.

20. F method performed by a Power over Data Lines (PoDL) circuit connected to a first conductor and a second conductor comprising:
- providing a first DC voltage by a DC power supply having a first terminal DC-coupled to the first conductor and a second terminal DC-coupled to the second conductor;
- transmitting and receiving differential data signals over the first conductor and the second conductor by a first transceiver having a first terminal and a second terminal;
- magnetically coupling signals between the first transceiver and the first conductor and the second conductor via a center-tapped first transformer having a primary winding coupled across the first terminal and the second terminal of the first transceiver;
- AC-coupling data signals between the first transceiver and the first conductor via a first capacitor coupled in series with the first conductor, the first transformer having a first secondary winding coupled between the first capacitor and a center tap of the first transformer;
- AC-coupling the data signals between the first transceiver and the second conductor via a second capacitor coupled in series with the second conductor, the first transformer having a second secondary winding coupled between the second capacitor and the center tap of the first transformer; and
- dividing the first DC voltage by a voltage divider connected to receive the first DC voltage from the DC power supply, the voltage divider generating a first divided voltage of approximately one half of the first DC voltage, wherein the first divided voltage is applied to the center tap of the first transformer.

* * * * *